United States Patent
Park et al.

(10) Patent No.: US 11,349,516 B2
(45) Date of Patent: May 31, 2022

(54) ELECTRONIC DEVICE IN WHICH TRAY FOR LOADING SIM CARD IS INSERTED, AND CONTROL METHOD THEREFOR

(71) Applicant: Samsung Electronics Co., Ltd., Gyeonggi-do (KR)

(72) Inventors: Dae Soo Park, Gyeonggi-do (KR); Jae Hong Kim, Gyeonggi-do (KR); Jang Hoon Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 109 days.

(21) Appl. No.: 16/961,114

(22) PCT Filed: Nov. 6, 2018

(86) PCT No.: PCT/KR2018/013370
§ 371 (c)(1),
(2) Date: Jul. 9, 2020

(87) PCT Pub. No.: WO2019/151619
PCT Pub. Date: Aug. 8, 2019

(65) Prior Publication Data
US 2020/0366328 A1 Nov. 19, 2020

(30) Foreign Application Priority Data

Feb. 5, 2018 (KR) .................. 10-2018-0014251

(51) Int. Cl.
*H04B 1/38* (2015.01)
*H04B 1/3818* (2015.01)
*G06F 11/07* (2006.01)

(52) U.S. Cl.
CPC ....... *H04B 1/3818* (2015.01); *G06F 11/0742* (2013.01); *G06F 11/0757* (2013.01); *H04B 2001/3894* (2013.01)

(58) Field of Classification Search
CPC .......... H04B 1/3818; H04B 2001/3894; H04B 1/0003; H04B 1/38; H04B 2215/066;
(Continued)

(56) References Cited

U.S. PATENT DOCUMENTS 6,304,454 B1 * 10/2001 Akamatsu ............ G06K 7/0021
361/752
7,164,927 B1 * 1/2007 Koch ...................... H04W 4/24
455/445
(Continued)

FOREIGN PATENT DOCUMENTS

EP 1712098 4/2009
EP 3242500 11/2017
(Continued)

OTHER PUBLICATIONS

English Translation of Written Opinion from Korean Patent Office (4 pages, dated Feb. 2, 2019)—Taken from Global Dossier.*

(Continued)

*Primary Examiner* — Stephen M D Agosta
(74) *Attorney, Agent, or Firm* — The Farrell Law Firm, P.C.

(57) ABSTRACT

Various embodiments of the present invention relate to a method for accurately detecting, by an electronic device, that a tray for loading a SIM card is detached. An electronic device according to various embodiments of the present invention may comprise: a tray for loading a SIM card; a first processor electrically connected to the tray; and a second processor electrically connected to the first processor, wherein the first processor is configured to transfer a pre-event to the second processor when a detachment event for the tray is detected, and the second processor is configured to identify, in each designated period, whether the SIM card is erroneous; and delay identification of whether the SIM card is erroneous, in response to reception of the (Continued)

pre-event. The present invention may further include various other embodiments.

11 Claims, 8 Drawing Sheets

(58) Field of Classification Search
CPC .. H04M 19/08; H04M 1/724; H04M 2250/74; H04M 3/56; H04M 1/72403; G06F 11/0742; G06F 11/0757; G06F 21/00; G06F 21/121; G06F 21/305; G06F 21/50; G06F 21/55; G06F 21/552; H04W 12/12; H04W 12/126; H04W 12/63; H04W 8/183; H04W 12/082; H04N 1/32363; H04N 1/32368; H04N 1/32379; H04N 1/327; H04N 1/32797
See application file for complete search history.

(56) References Cited

U.S. PATENT DOCUMENTS

| | | | |
|---|---|---|---|
| 10,078,797 B1* | 9/2018 | Almorshedi | G06K 13/0825 |
| 10,235,609 B1* | 3/2019 | Jeon | H04B 1/3818 |
| 2005/0075138 A1* | 4/2005 | Page | H04B 1/3818 |
| | | | 455/559 |
| 2005/0094592 A1* | 5/2005 | Schmidt | H04W 12/50 |
| | | | 370/328 |
| 2007/0293184 A1 | 12/2007 | Nevalainen et al. | |
| 2009/0167545 A1* | 7/2009 | Osaka | H04M 1/0274 |
| | | | 340/647 |
| 2009/0247122 A1* | 10/2009 | Fitzgerald | H04W 12/126 |
| | | | 455/410 |
| 2011/0143703 A1* | 6/2011 | Seo | H04W 48/18 |
| | | | 455/404.1 |
| 2012/0083316 A1* | 4/2012 | Lee | G06K 7/0021 |
| | | | 455/558 |
| 2012/0100895 A1* | 4/2012 | Priyantha | G06F 1/3293 |
| | | | 455/574 |
| 2013/0109415 A1* | 5/2013 | Seo | H04W 52/0251 |
| | | | 455/458 |
| 2013/0184029 A1* | 7/2013 | Lim | H04W 8/183 |
| | | | 455/551 |
| 2013/0237197 A1* | 9/2013 | Ruvalcaba | H04W 8/183 |
| | | | 455/418 |
| 2013/0287070 A1* | 10/2013 | Lee | H04B 1/38 |
| | | | 375/219 |
| 2014/0113641 A1* | 4/2014 | Deng | H04W 52/0229 |
| | | | 455/450 |
| 2014/0176154 A1* | 6/2014 | Kim | G06K 7/0069 |
| | | | 324/538 |
| 2014/0187291 A1* | 7/2014 | Seo | H04W 52/028 |
| | | | 455/558 |
| 2014/0203081 A1* | 7/2014 | Yun | G06K 7/10851 |
| | | | 235/436 |
| 2015/0104979 A1* | 4/2015 | Li | H01R 13/2442 |
| | | | 439/626 |
| 2015/0304317 A1* | 10/2015 | Wang | H04L 63/0853 |
| | | | 455/411 |
| 2017/0242474 A1 | 8/2017 | Lee | |
| 2019/0149985 A1 | 5/2019 | Breuer et al. | |

FOREIGN PATENT DOCUMENTS

| | | |
|---|---|---|
| KR | 1020140089645 | 7/2014 |
| KR | 1020170087831 | 7/2017 |
| KR | 1020170098094 | 8/2017 |

OTHER PUBLICATIONS

PCT/ISA/210 Search Report issued on PCT/KR2018/013370, dated Feb. 19, 2019, pp. 5.
PCT/ISA/237 Written Opinion issued on PCT/KR2018/013370, dated Feb. 19, 2019, pp. 4.

* cited by examiner

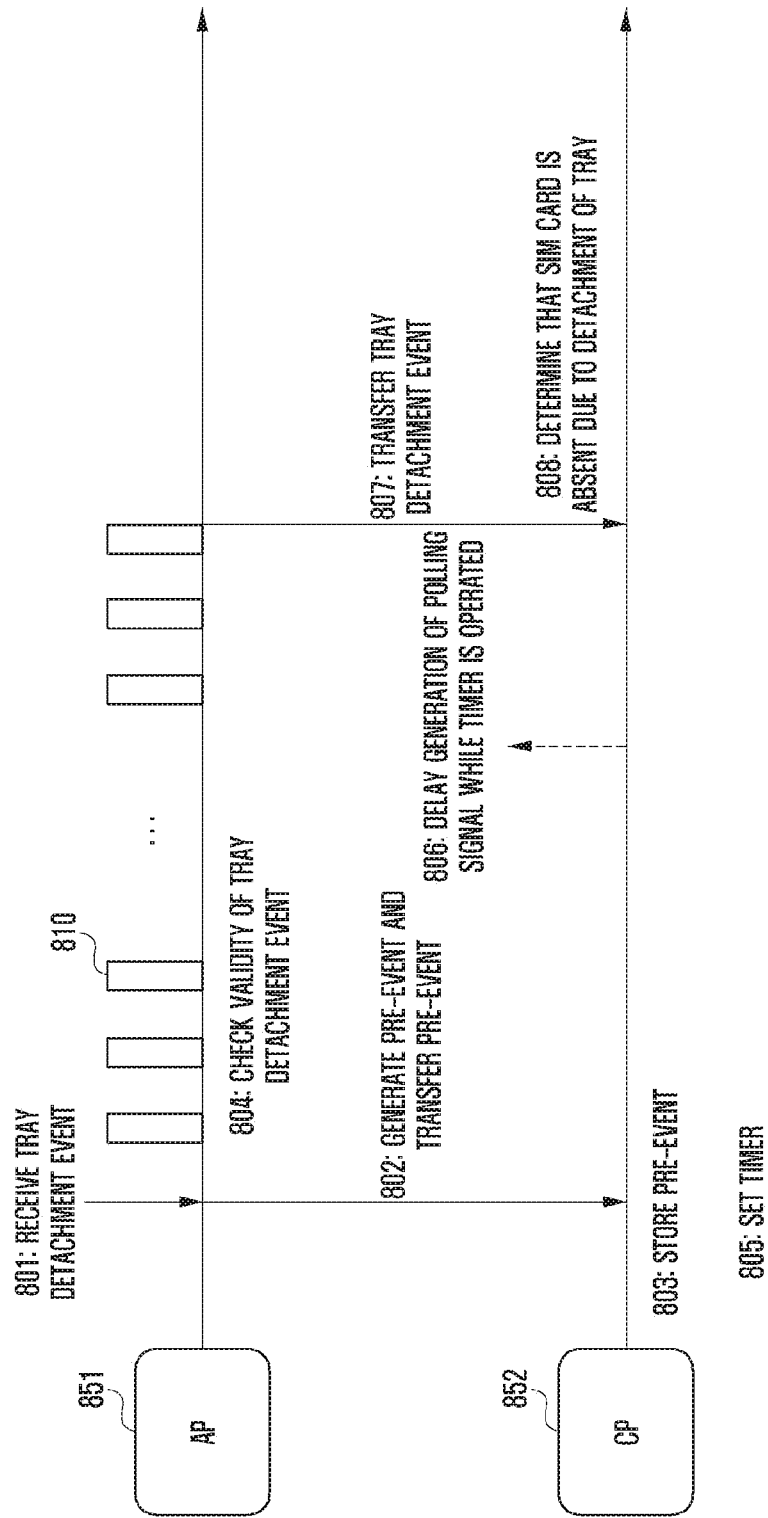

ELECTRONIC DEVICE IN WHICH TRAY FOR LOADING SIM CARD IS INSERTED, AND CONTROL METHOD THEREFOR

PRIORITY

This application is a National Phase Entry of PCT International Application No. PCT/KR2018/013370 which was filed on Nov. 6, 2018, and claims priority to Korean Patent Application No. 10-2018-0014251, which was filed on Feb. 5, 2018, the content of each of which is incorporated herein by reference.

TECHNICAL FIELD

Various embodiments of the disclosure relate to a method of accurately detecting, by an electric device, that a tray for loading a SIM card is detached.

BACKGROUND ART

With the development of recent digital technology, various electronic devices capable of handling communication and various businesses such as mobile communication terminals, personal digital assistants (PDAs), electronic organizers, smart phones, tablet personal computers (PCs), and so on have come into the market.

Such electronic devices use services of a telecom operator via a subscriber identification module (SIM) card (hereinafter referred to as "SIM card").

DISCLOSURE OF INVENTION

Technical Problem

Such electronic devices are designed to detect whether or not the SIM card is inserted or whether or not there is an error in the SIM card after booting up. In the standard specification 3GPP TS 31.101, the electronic devices are designed to generate a polling signal at regular intervals in order to identify whether or not the SIM card is inserted.

The electronic devices according to the standard specification, however, have a problem that absence of the SIM card is not accurately identified because there is an error in the SIM card and because a tray for loading the SIM card is detached from the electronic device when identifying the state of the SIM card using the polling signal.

Various embodiments of the disclosure provide an electronic device capable of accurately detecting that a tray for loading a SIM card is detached, and a control method therefor.

Solution to Problem

According to various embodiments of the disclosure, an electronic device includes: a tray configured to load a SIM card; a first processor electrically connected to the tray; and a second processor electrically connected to the first processor. The first processor is configured to transfer a pre-event to the second processor if a tray detachment event is detected, and the second processor is configured to identify, in each designated cycle, whether or not there is an error in the SIM card, and delay identification of whether or not there is an error in the SIM card, in response to reception of the pre-event.

According to various embodiments of the disclosure, a control method for an electronic device into which a tray for loading a SIM card is inserted and which includes a first processor electrically connected to the tray, and a second processor electrically connected to the first processor, includes: a process of the first processor transferring a pre-event to the second processor in response to detection of a tray detachment event; and a process of the second processor identifying, in each designated cycle, whether or not there is an error in the SIM card, and delaying identification of whether or not there is an error in the SIM card, in response to reception of the pre-event.

Advantageous Effects of Invention

In various embodiment of the disclosure, an electronic device accurately detects that a tray for loading a SIM card is detached, and thereby a malfunction of the electronic device due to erroneous recognition of whether or not the SIM card is inserted can be prevented. Further, the electronic device can be designed to have a waterproof function. However, if the tray is detached from the electronic device, waterproof performance of the electronic device cannot be ensured. The electronic device according to various embodiments of the disclosure can prevent a malfunction of erroneously recognizing the tray detachment event as an internal error state of the SIM card, and increase convenience of a user by accurately outputting a waterproof alert based on the tray detachment event. In addition, various embodiments of the disclosure can prevent a malfunction of at least one process that is configured to operate in response to the tray detachment event detected by the electronic device.

BRIEF DESCRIPTION OF DRAWINGS

FIG. 8 is a flow chart illustrating a control method for the electronic device according to various embodiments of the disclosure.

MODE FOR THE INVENTION

Figure 1:
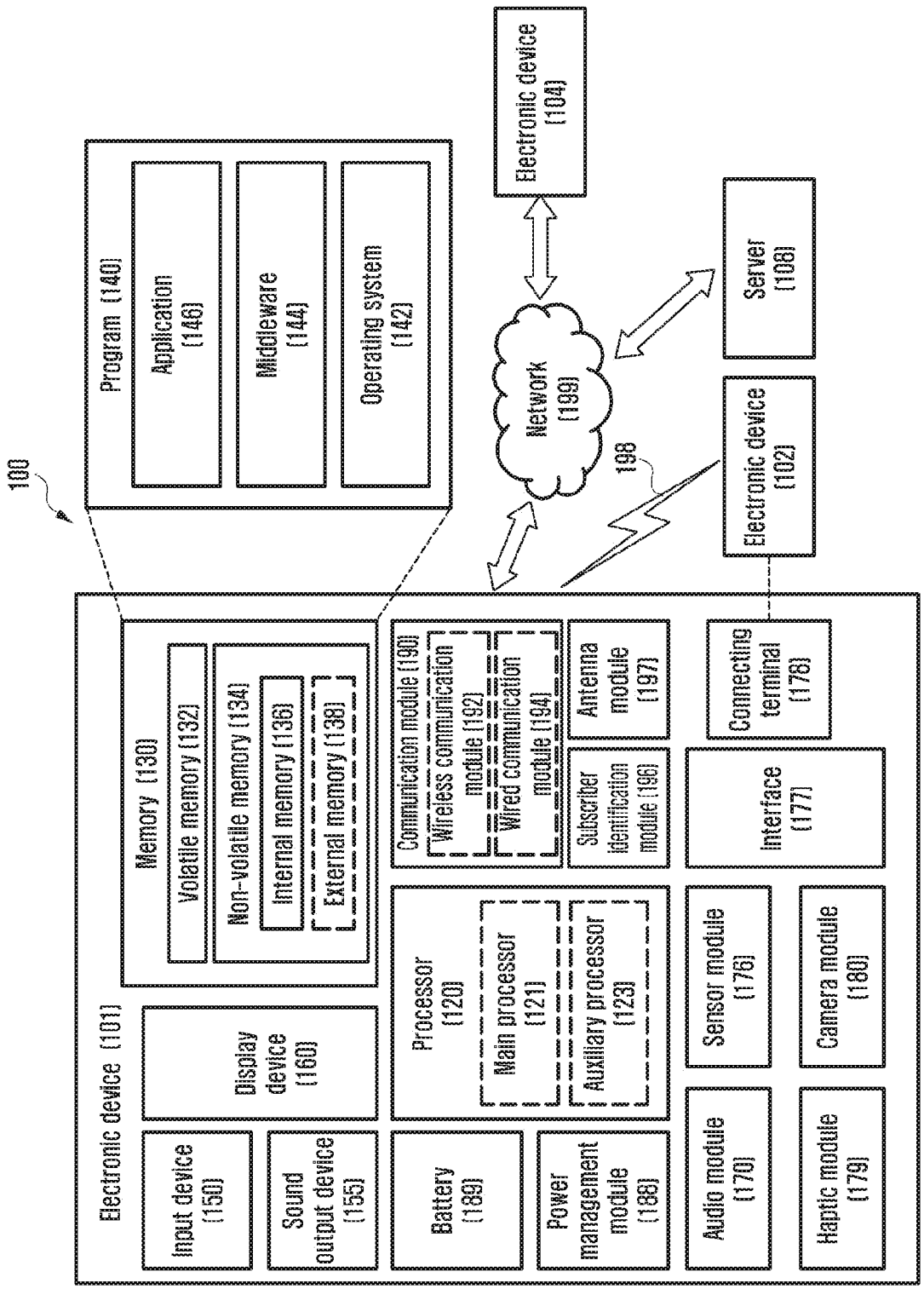
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to various embodiments of the disclosure may include a tray for loading a SIM card, a first processor 751 that is electrically connected to the tray, and a second processor 752 that is electrically connected to the first processor 751. The first processor 751 may be configured to transfer a pre-event to the second processor 752 when a tray detachment event is detected, and the second processor 752 may be configured to identify whether or not there is an error in the SIM card in each designated cycle, and delay identification of whether or not there is an error in the SIM card in response to reception of the pre-event. The first processor 751 may be configured to determine whether or not the tray detachment event is valid for a designated period in response to detection of the tray detachment event, and transfer the tray detachment event to the second processor 752 if the tray detachment event is valid. The second processor 752 may be configured to generate a polling signal in each designated cycle, detect a response to the polling signal from the SIM card, determine that there is an error in the SIM card if there is no response from the SIM card, and determine that there is no error in the SIM card even if there is no response from the SIM card after the polling signal is generated in response to reception of the pre-event. The second processor 752 may be configured to determine a current state to be the tray detachment event even if there is no response from the SIM card after the polling signal is generated in response to reception of the tray detachment event from the first processor 751. The second processor 752 may be configured to generate a polling signal in each designated cycle, detect a response to the polling signal from the SIM card, determine that there is an error in the SIM card if there is no response of the SIM card, drive a designated timer in response to reception of the pre-event, and generate no polling signal while the designated timer is driven. The first processor 751 may be an application processor, and the second processor 752 may be a communication processor. The tray may be designed to additionally load a memory card. If the tray detachment event is valid, the first processor 751 may be configured to output a designated notification. The designated notification may include a message informing the electronic device that a water-proof function is in an inactive state. The second processor 752 may be configured to set a designated parameter in response to reception of the pre-event, and delay identification of whether or not there is an error in the SIM card on the basis of the designated parameter.

Figure 2:
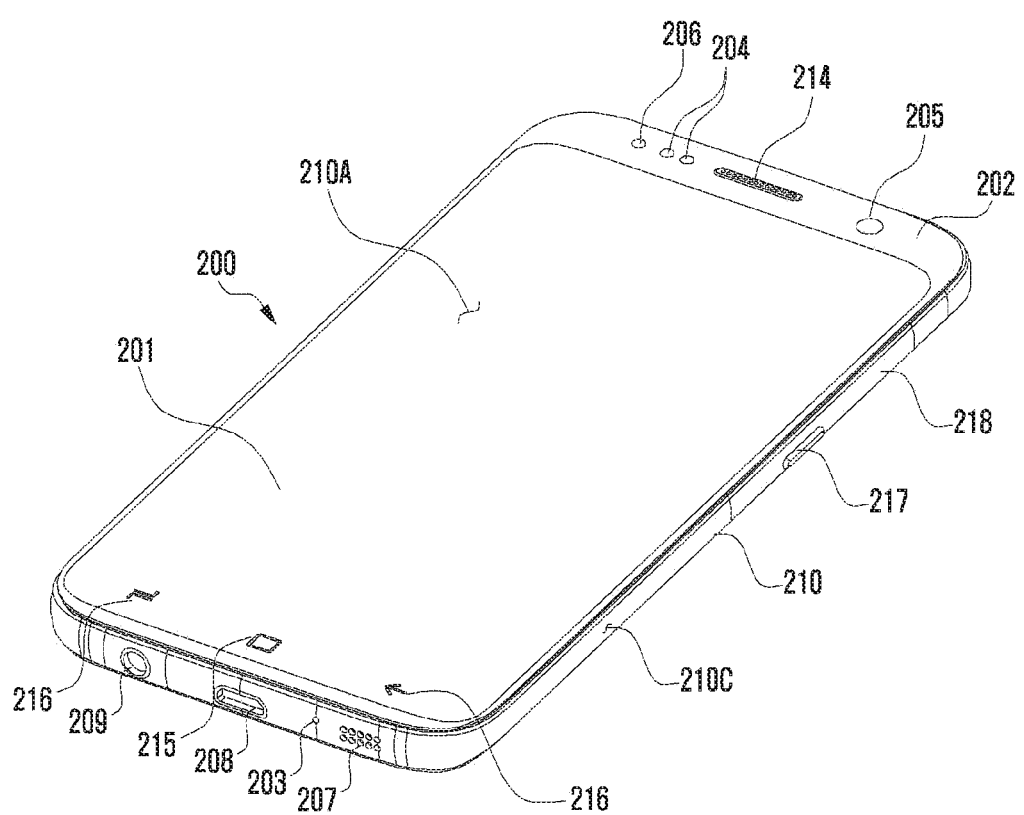
FIG. 2 is a perspective view of a front surface of an electronic-vice according to an embodiment.
Figure 3:
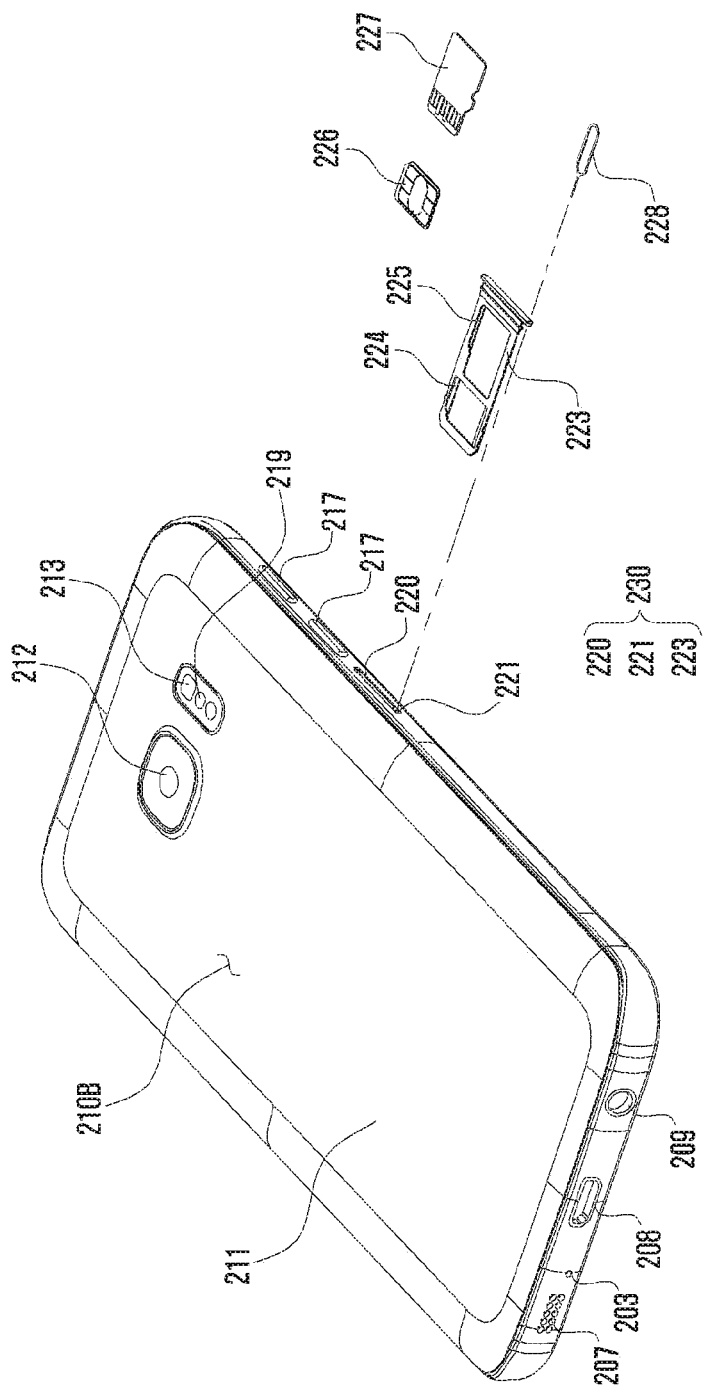
FIG. 3 is a perspective view of a rear surface of the electronic device of FIG. 2.

FIG. 2 is a perspective view of a front surface of an electronic device according to an embodiment. FIG. 3 is a perspective view of a rear surface of the electronic device of FIG. 2.

Referring to FIGS. 2 and 3, an electronic device 200 (e.g., the electronic device 101 of FIG. 1) according to an embodiment may include a housing 210 that includes a first surface (or a front surface) 210A, a second surface (or a rear surface) 210B, and a lateral surface 210C surrounding a space between the first surface 210A and the second surface 210B. According to an embodiment, the housing 210 may be referred to as a structure that provides some of the first surface 210A, the second surface 210B, and the lateral surface 210C of FIG. 2.

According to an embodiment at least a part of the first surface 210A may be formed of a substantially transparent front plate 202 (e.g., a glass or polymer plate including various coating layers). According to an embodiment, the second surface 210B may be formed of a substantially opaque rear plate 211. The rear plate 211 may be formed of a coated or colored glass, ceramic, a polymer, a metal (e.g., aluminum, stainless steel (STS), or magnesium), or a combination of at least two thereof. The lateral surface 210C may be coupled with the front surface plate 202 and the rear surface plate 211, and may be formed of a lateral bezel structure (or a "lateral member") 218 including a metal and/or a polymer. In a certain embodiment, the rear plate 211 and the lateral bezel structure 218 may be integrally formed, and include the same material (e.g., a metal material such as aluminum).

According to an embodiment, the electronic device 200 may include at least one or more of a display 201 (e.g., the display device 160 of FIG. 1), an audio module 203, 207, or 214 (e.g., the audio module 170 of FIG. 1), a sensor module 204 or 219 (e.g., the sensor module 176 of FIG. 1), a camera module 205, 212, or 213 (e.g., the camera module 180 of FIG. 1), a key input device 215, 216, or 217 (e.g., the input device 150 of FIG. 1), an indicator 206, and a connector hole 208 or 209. In a certain embodiment, the electronic device 200 may omit at least one of the components (e.g., the key input device 215, 216, or 217, or the indicator 206) or additionally include other components.

According to an embodiment, the display 201 may be exposed through a part of the front plate 202. For example, the display 201 may be coupled with or disposed close to a touch sensor circuit, a pressure sensor capable of measuring intensity (pressure) of a touch, and/or a stylus pen based on a magnetic field.

According to an embodiment, the audio module 203, 207, or 214 may include a microphone hole 203 and a speaker hole 207 or 214. For example, a microphone for obtaining an external sound may be disposed in the microphone hole 203. In a certain embodiment, a plurality of microphones may be disposed in the microphone hole 203 so as to be able to detect a direction of a sound. According to an embodiment, the speaker hole 207 or 214 may include an external speaker hole 207 and a receiver hole 214 for communication. In a certain embodiment, the speaker hole 207 or 214 and the microphone hole 203 are implemented by one hole, or a speaker may be included without the speaker hole 207 or 214 (e.g., a piezo speaker).

According to an embodiment, the sensor module 204 or 219 may generate an electric signal or a data value corresponding to an internal operation state or an external environment state of the electronic device 200. For example, the sensor module 204 or 219 may include a first sensor module 204 (e.g., a proximity sensor) and/or a second sensor module (not illustrated) (e.g., a fingerprint sensor) that are disposed on the first surface 210A of the housing 210, and/or a third sensor module 219 (e.g., a HRM sensor) that is disposed on the second surface 210B of the housing 210. According to an embodiment, the fingerprint sensor may be disposed on the first surface 210A as well as the second surface 210B of the housing 210 (e.g., a home key button 215). According to an embodiment, the electronic device 200 may further include at least one of sensor modules (not illustrated), for example a gesture sensor, a gyro sensor, an atmospheric pressure sensor, a magnetic sensor, an accelerator sensor, a grip sensor, a color sensor, an infrared (IR) sensor, a biological sensor, a temperature sensor, a humidity sensor, or an illuminance sensor 204.

According to an embodiment, the camera module 205, 212, or 213 may include a first camera device 205 that is disposed on the first surface 210A of the electronic device 200, and a second camera device 212 and/or a flash 213 that are disposed on the second surface 210B. According to an embodiment, the camera module 205 or 212 may include one or more lenses, an image sensor, and/or an image signal processor. According to an embodiment, the flash 213 may include a light emitting diode or a xenon lamp. In a certain embodiment, two or more lenses (wide-angle and telephoto lenses) and image sensors may be disposed on one surface of the electronic device 200.

According to an embodiment, the key input device 215, 216, or 217 may include a home key button 215 that is disposed on the first surface 210A of the housing 210, a touch pad 216 that is disposed around the home key button 215, and/or a side key button 217 that is disposed on the lateral surface 210C of the housing 210. In another embodiment, the electronic device 200 may not include some or all of the aforementioned key input devices 215, 216, and 217, and some or all of the key input devices 215, 216, and 217 which are not included may be implemented on the display 201 in another form such as, for example, a soft key.

According to an embodiment, the indicator 206 may be disposed, for example, on the first surface 210A of the housing 210. For example, the indicator 206 may provide information about a state of the electronic device 200 in a form of light, and include an LED.

According to an embodiment, the connector hole 208 or 209 may include a first connector hole 208 that can house a connector (e.g., a USB connector) for transmitting and receiving power and/or data to and from an external electronic device, and/or a second connector hole 209 that can house a connector (e.g., an earphone jack) for transmitting and receiving an audio signal to and from an external electronic device.

According to an embodiment, the electronic device 200 may include a tray structure 230. For example, the tray structure 230 may include a tray 223 that loads a storage medium 226 or 227, an opening 220 into which the tray 223 is inserted, a through-hole 221 located close to the opening 220, and a space between the front and rear plates 202 and 211 for housing the storage medium 226 or 227. For example, the opening 220 may be disposed in the lateral member 218. For example, the tray 223 may be detachably coupled to the lateral member 218. The storage medium 226 or 227 may include, for example, a memory card 227 such as a secure digital (SD) card or a micro SD card, or a subscriber identity module (SIM) card 226. According to an embodiment, the storage medium 226 or 227 may be loaded on the tray 223, and the tray 223 on which the storage medium 226 or 227 is loaded may be inserted into the space between the front and rear plates 202 and 211 through the opening 220. For example, the space may include a socket designed to house the tray 223, According to an embodiment, the tray 223 may include a portion 224 for loading the SIM card 226, and another portion 225 for loading the memory card 227.

According to an embodiment, to detach the tray 223 from the electronic device 200, a through-hole 221 may be formed in a portion close to the opening 220 in the lateral member 218, If an external object 228 (e.g., a detachment pin) is inserted into the through-hole 221, the tray 223 may be detached. For example, an external object 228 is inserted into the through-hole 221 and is pressed at a portion close to the socket designed to house the tray 223, a tray detachment structure designed to detach the tray 223 may be disposed in the space between the front and rear plates 202 and 211.

Figure 4:
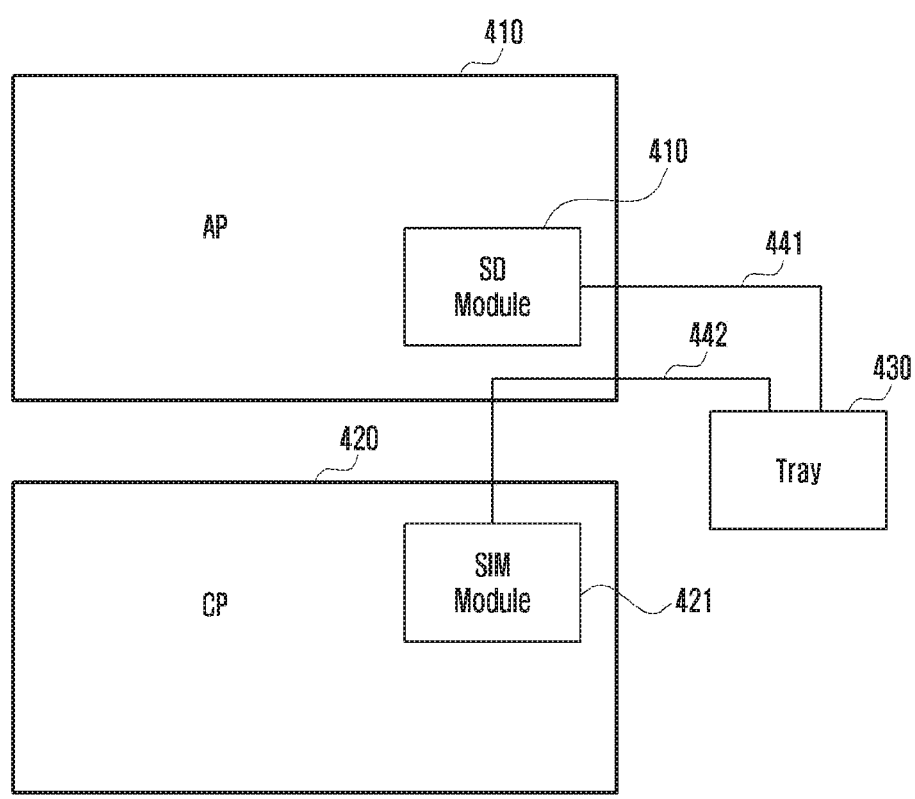
FIG. 4 is a block diagram illustrating some of components of the electronic device according to various embodiments of the disclosure.

FIG. 4 is a block diagram illustrating some of the components of the electronic device according to various embodiments of the disclosure.

Referring to FIG. 4, the electronic device (e.g., the electronic device 101 FIG. 1 or the electronic device 200 of FIG. 2) may include a first processor 410 (e.g., the main processor 121 of FIG. 1), a second processor 420 (e.g., the auxiliary processor 123 of FIG. 1), and a tray 430 (e.g., the tray 223 of FIG. 2).

According to an embodiment, the first processor 410 may be an application processor, and include an SD module 410. According to an embodiment, the SD module 410 may be a software module that executes a process related to an SD card (e.g., the memory card 227 of FIG. 2). According to an embodiment, the SD module 410 may detect an insertion or detachment event for the tray 430 into or from the electronic device 200, and control initialization and completion of a processor related to the SD card 227 on the basis of at least one of the insertion event or the detachment event.

According to an embodiment, the SD module 410 of the first processor 410 may be connected with the tray 430 through a first line 441. According to an embodiment, the first processor 410 may detect an event in which the tray 430 is detached from the electronic device 200 through the first line 441. Hereinafter, the event in which the tray 430 is detached from the electronic device 200 is defined herein as "tray detachment event".

According to an embodiment, the first processor 410 may determine whether or not the tray detachment event is valid for a designated period in response to detection of the tray detachment event. For example, the first processor 410 may detect a signal (hereinafter referred to as "tray signal") from the tray 430 for a designated period (e.g., about 500 ms) in order to prevent malfunction. For example, the first processor 410 may identify whether or not the tray signal is received in each designated cycle, and identify; whether or not the tray signal is received a designated number of times (e.g., 10 times). According to an embodiment, if the tray signal is not received for a designated period, the first processor 410 may determine that the tray detachment event is valid. According to an embodiment, in response to determination that the tray detachment event is valid, the first processor 410 may transmit the tray detachment event to the second processor 420.

According to an embodiment, the first processor 410 may generate a pre-event in response to detection of the tray detachment event, and transmit the generated pre-event to the second processor 420. For example, the pre-event may be a signal that instructs the second processor 420 to delay an operation of identifying, whether or not there is an error in a SIM card (e.g., the SIM card 226 of FIG. 2).

According to an embodiment, the first processor 410 may control a display (e.g., the display 201 of FIG. 2) in response to determination that the tray detachment event is valid, and output a designated notification. For example, the designated notification may include a message that notifies a user that a waterproof function is inactive because the tray 430 is detached from the electronic device 200. Alternatively, the second processor 420 may perform an operation of outputting the designated notification. For example, the second processor 420 may control the display 201 to output the designated notification in response to reception of the tray detachment event from the first processor 410.

According to an embodiment, the second processor 420 may be a communication processor, and include a SIM module 421. According to an embodiment, the SIM module 421 may be a software module that executes a process related to the SIM card 226. According to an embodiment, the SIM module 421 may detect the insertion or detachment event for the tray 430 into or from the electronic device 200, and control initialization and completion of a processor related to the SIM card 226 on the basis of at least one of the insertion event or the detachment event. According to an embodiment, the SIM module 421 of the second processor 420 may be connected with the first processor 410 and the tray 430 via the second line 442. According to an embodiment, the second line 442 may be provided to go by way of the first processor 410. According to an embodiment, the second processor 420 may receive the detachment event for the tray 430 from the first processor 410 via the second line 442.

According to an embodiment, the second processor 420 may detect that there is an error in the SIM card 226 in each designated cycle. For example, the error of the SIM card 226 may include an internal error of the SIM card 226, and absence of the SIM card 226 caused by the tray detachment event. According to an embodiment, the second processor 420 may generate a polling signal in a cycle to detect the error of the SIM card 226. For example, the second processor 420 may generate a polling signal in each designated cycle, detect a response to the polling signal from the SIM card 226, and determine that a state of the SIM card 226 is an error if there is no response to the polling signal from the SIM card 226.

According to an embodiment, the second processor 420 may delay identification of whether or not there is an error in the SIM card 226 in response to reception of a pre-event from the first processor 410, For example, the second processor 420 may be configured to determine that there is no error in the SIM card 226 even if there is no response from the SIM card 226 after the polling signal is generated in response to reception of the pre-event from the first processor 410. According to another embodiment, the second processor 420 may delay the generation of the polling signal for a designated period in response to reception of the pre-event from the first processor 410, For example, the second processor 420 may delay the generation of the polling signal while the first processor 410 determines whether or not the tray detachment event is valid. If the tray detachment event is valid, the second processor 420 may delay the generation of the polling signal, thereby preventing a malfunction of erroneously recognizing the state of the SIM card 226 as an internal error state of the SIM card 226.

According to various embodiments of the disclosure, the second processor 420 may determine that there is no error in the SIM card 226 even if there is no response from the SIM card 226 after the polling signal is generated in response to reception of the pre-event, thereby accurately discriminating the internal error of the SIM card 226 and the absence of the SIM card 226 caused by the tray detachment event, and prevent a malfunction of the electronic device 200 due to erroneous recognition of whether or not the SIM card 226 is inserted.

According to an embodiment, the tray 430 may be designated to load at least one SIM card 226, and at least one SD card 227, According to an embodiment, the tray 430 may be connected with at least one processor through the first line 441 and the second line 442. For example, the tray 430 may be connected with the first processor 410 through the first line 441, and the second processor 420 through the second line 442 going by way of the first processor 410. According to various embodiments, the first line 441 and the second line 442 may be configured as a general purpose input/output (GPIO) line.

A control method for an electronic device, into which a tray for loading a SIM card is inserted according to various embodiments of the disclosure and which includes a first processor 751 that is electrically connected with the tray and a second processor 752 that is electrically connected with the first processor 751, may include a process of the first processor 751 transferring a pre-event to the second processor 752 in response to detection of a tray detachment event, and a process of the second processor 752 identifying whether or not there is an error in the SIM card in each designated cycle and delaying identification of whether or not there is an error in the SIM card in response to reception of the pre-event. The control method may further include a process of the first processor 751 determining whether or not the tray detachment event is valid for a designated period in response to detection of the tray detachment event, and a process of the first processor 751 transferring the tray detachment event to the second processor 752 if the tray detachment event is valid. The second processor 752 may be configured to generate a polling signal in each designated cycle, detect a response to the polling signal from the SIM card, and determine that there is an error in the SIM card if there is no response from the SIM card. The process of delaying identification of whether or not there is an error in the SIM card may include a process of the second processor 752 determining that there is no error in the SIM card even if there is no response from the SIM card after the polling signal is generated in response to reception of the pre-event. The control method may further include a process of the second processor 752 determining that a current state is a detached state of the tray even if there is no response from the SIM card after the polling signal is generated in response to reception of the tray detachment event from the first processor 751. The second processor 752 may be configured to generate a polling signal in each designated cycle, detect a response to the polling signal from the SIM card, and determine that there is an error in the SIM card if there is no response from the SIM card. The process of delaying identification of whether or not there is an error in the SIM card may include a process of the second processor 752 driving a designated timer in response to reception of the pre-event, and a process of the second processor 752 generating no polling signal while the designated timer is driven. The first processor 751 may be an application processor, and the second processor 752 may be a communication processor. The tray may be designed to additionally load a memory card. The control method may further include a process of the first processor 751 outputting a designated notification if the tray detachment event is valid. The designated notification may include a message that notifies that the electronic device is in a state in which a waterproof function is inactive. The control method may further include a process of the second processor 752 setting a designated parameter in response to reception of the pre-event, and a process of the second processor 752 delaying identification of whether or not there is an error in the SIM card on the basis of the designated parameter.

Figure 5:
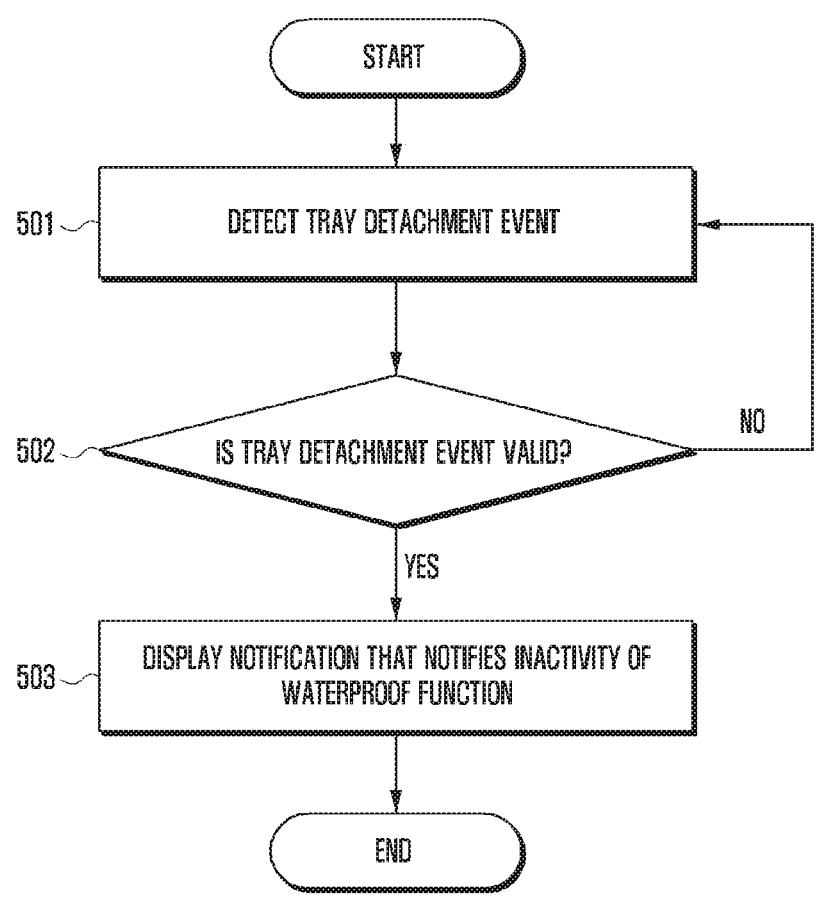
FIG. 5 is a flow chart illustrating a control method for the electronic device according to various embodiments of the disclosure.
Figure 6:
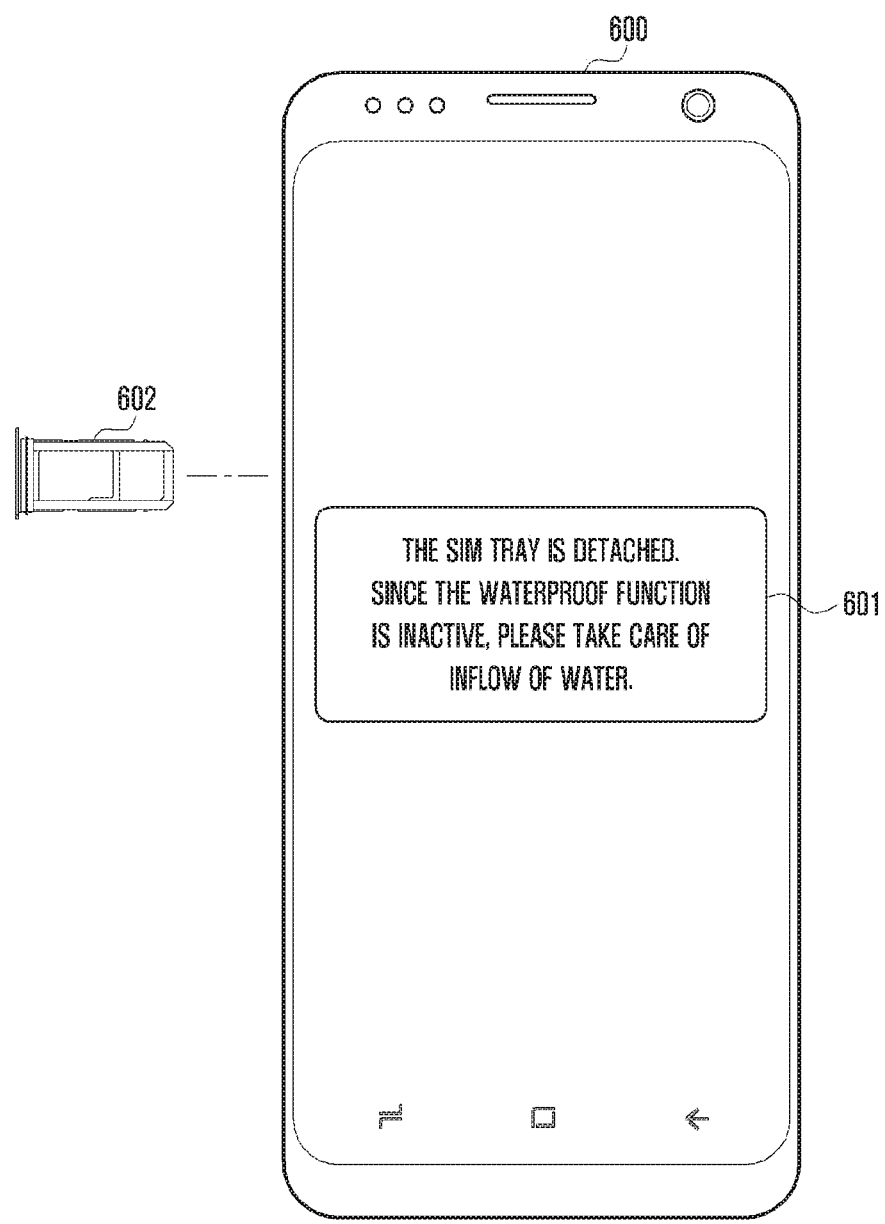
FIG. 6 illustrates an example of a designated notification output from the electronic device in response to determination of the electronic device that a tray detachment event is valid.

FIG. 5 is a flow chart illustrating a control method for an electronic device according to various embodiments of the disclosure. FIG. 6 illustrates an example of a designated notification output from the electronic device in response to determination of the electronic device that the tray detachment event is valid.

Referring to FIG. 5, a processor (e.g., the processor 120 of FIG. 1) of the electronic device (e.g., the electronic device 101 of FIG. 1 or the electronic device 200 of FIG. 2) according to an embodiment may detect a detachment event in which a tray 430 (e.g., the tray 223 of FIG. 2) is detached from the electronic device 200 in process 501. For example, a first processor 410 (e.g., the main processor 121 of FIG. 1) may detect the tray detachment event through a first line (e.g., the first line 441 of FIG. 4).

According to an embodiment, the first processor 410 may generate a pre-event in response to detection of the tray detachment event, and transfer the generated pre-event to a second processor 420 (e.g., the auxiliary processor 123 of FIG. 1). For example, the pre-event may be a signal that instructs the second processor 420 to delay identification of whether or not there is an error in a SIM card (e.g., the SIM card 226 of FIG. 2).

According to an embodiment, the second processor 420 may delay identification of whether or not there is an error in the SIM card 226 in response to reception of the pre-event from the first processor 410. For example, the second processor 420 may be configured to determine that there is no error in the SIM card 226 even if there is no response from the SIM card 226 after the polling signal is generated in response to reception of the pre-event from the first processor 410. According to another embodiment, the second processor 420 may delay the generation of the polling signal for a designated period in response to reception of the pre-event from the first processor 410. For example, the second processor 420 may delay the generation of the polling signal while the first processor 410 determines whether or not the tray detachment event is valid. The second processor 420 may delay the generation of the polling signal if the tray detachment event is valid, thereby preventing a malfunction of erroneously recognizing the state of the SIM card 226 as an internal error state of the SIM card 226.

In process 502, the processor according to an embodiment may determine whether or not the tray detachment event is valid. For example, the first processor 410 may determine whether or not the tray detachment event is valid for a designated period M response to detection of the tray detachment event. For example, the first processor 410 may detect a signal (hereinafter referred to as "tray signal") from the tray 430 for a designated period (e.g., about 500 ms) to prevent a malfunction. For example, the first processor 410 may identify whether or not the tray signal is received in each designated cycle, and whether or not the tray signal is received a designated number of times (e.g., 10 times). According to an embodiment, if the tray signal is not received for a designated period, the first processor 410 may determine that the tray detachment event is valid. According to an embodiment, the first processor 410 may transfer the tray detachment event to the second processor 420 in response to determination that the tray detachment event is valid.

In process 503, the processor according to an embodiment may display a notification that notifies that the electronic device 200 is in a state in which the waterproof function is inactive in response to determination that the tray detachment event is valid. For example, the first processor 410 may control a display (e.g., the display 201 of FIG. 2) to output a designated notification in response to determination that the tray detachment event is valid. For example, as illustrated in FIG. 6, the designated notification 601 may include a message that notifies a user that the waterproof function is inactive because a tray 602 (e.g., the tray 430 of FIG. 4) is separated from an electronic device 600 (e.g., the electronic device 101 of FIG. 1 or the electronic device 200 of FIG. 2). Alternatively, the second processor 120 may perform the process of outputting the designated notification. For example, the second processor 420 may control the display 201 to output the designated notification in response to reception of the tray detachment event from the first processor 410.

Hereinafter, the control method for the electronic device will be described in Greater detail.

Figure 7:
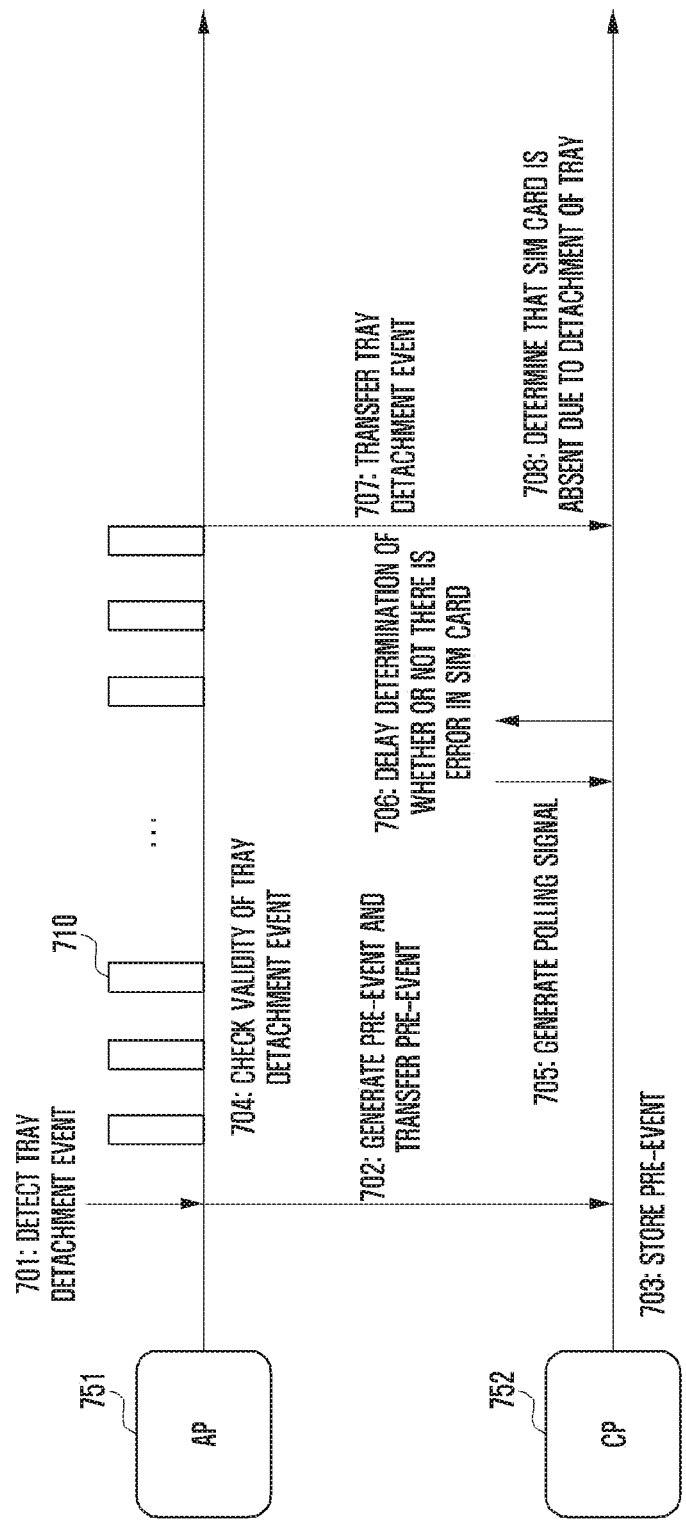
FIG. 7 is a flow chart illustrating a control method for the electronic device according to various embodiments of the disclosure.

FIG. 7 is a flow chart illustrating the control method for the electronic device according to an embodiment of the disclosure.

In processes 701 and 702, a first processor 751 (e.g., the first processor 410 of FIG. 4) according to an embodiment may generate a pre-event in response to detection of a tray detachment event, and transfer the generated pre-event to a second processor 752 (e.g., the second processor 420 of FIG. 4). For example, the pre-event may be a signal that instructs the second processor 752 to delay identification of whether or not there is an error in a SIM card (e.g., the SIM card 226 of FIG. 2).

In process 703, the second processor 752 according to an embodiment may store the pre-event in response to reception of the pre-event from the first processor 751. For example, the second processor 752 may set a designated parameter in response to reception of the pre-event. According to an embodiment, the designated parameter may be set to 0 or 1. For example, the second processor 752 may set the designated parameter to 1 in response to reception of the pre-event.

In process 704, the first processor 751 according to an embodiment may determine whether or not the tray detachment event is valid. For example, the first processor 751 may determine whether or not the tray detachment event is valid for a designated period in response to detection of the tray detachment event. For example, the first processor 751 may detect a signal (hereinafter referred to as "tray signal") from a tray 430 (e.g., the tray 223 of FIG. 2) for a designated period (e.g., about 500 ms) to prevent a malfunction. For example, the first processor 751 may identify whether or not the tray signal is received in each designated cycle, and whether or not the tray signal is received a designated number of times (e.g., 10 times). In FIG. 7, a reference sign 710 may be a period for which the first processor 751 identifies whether or not the tray signal is received. According to an embodiment, if the tray signal is not received for a designated period, the first processor 751 may determine that the tray detachment event is valid.

In process 705, the second processor 752 according to an embodiment may generate a polling signal in each designated cycle to detect a state of the SIM card 226. For example, the second processor 752 may generate a polling signal after the pre-event is received from the first processor 751.

In process 706, the second processor 752 according to an embodiment may determine that the state of the SIM card 226 is an error if there is no response to the polling signal from the SIM card 226, and delay determination of whether or not there is an error in the SIM card 226 on the basis of a value of the designated parameter. For example, the second processor 752 may determine that there is no error in the SIM card 226 even if there is no response from the SIM card 226 after the polling signal is generated in response to reception of the pre-event from the first processor 751.

In process 707, the first processor 751 according to an embodiment may determine that the tray detachment event is valid if the tray signal is not received for a designated period, and transfer the tray detachment event to the second processor 752 on the basis of the determination.

In process 708, the second processor 752 according to an embodiment may determine that the state of the SIM card 226 is an absent state due to the detachment of the tray 430 in response to reception of the tray detachment event from the first processor 751. In an embodiment of the disclosure, if the tray detachment event is valid, the second processor 752 may delay determination of whether or not there is an error in the SIM card 226, thereby preventing a malfunction of erroneously recognizing the state of the SIM card 226 as an internal error state of the SIM card 226, FIG. 8 is a flow chart illustrating the control method for the electronic device according to an embodiment of the disclosure.

In processes 801 and 802, a first processor 851 (e.g., the first processor 410 of FIG. 4) according to an embodiment may generate a pre-event in response to detection of a tray detachment event, and transfer the generated pre-event to a second processor 852 (e.g., the second processor 420 of FIG. 4), For example, the pre-event may be a signal that instructs the second processor 852 to delay identification of whether or not there is an error in a SIM card (e.g., the SIM card 226 of FIG. 2).

In process 803, the second processor 852 according to an embodiment may store the pre-event in response to reception of the pre-event from the first processor 851. For example, the second processor 852 may set a designated parameter in response to reception of the pre-event. According to an embodiment, the designated parameter may, be set to 0 or 1. For example, the second processor 852 may set the designated parameter to 1 in response to reception of the pre-event.

In process 804, the first processor 851 according to an embodiment may determine whether or not the tray detachment event is valid. For example, the first processor 851 may determine whether or not the tray detachment event is valid for a designated period in response to detection of the tray detachment event. For example, the first processor 851 may detect a signal (hereinafter referred to as "tray signal") from a tray 430 for a designated period (e.g., about 500 ms) to prevent a malfunction. For example, the first processor 851 may identify whether or not the tray signal is received in each designated cycle, and whether or not the tray signal is received a designated number of times (e.g., 10 times). In FIG. 8, a reference sign 810 may be a period for which the first processor 851 identifies whether or not the tray signal is received. According to an embodiment, if the tray signal is not received for a designated period, the first processor 851 may determine that the tray detachment event is valid.

In processes 805 and 806, the second processor 852 according to an embodiment may set a designated timer in response to reception of the pre-event from the first processor 851, and generate no polling signal while the designated timer is driven. For example, the second processor 852 may delay the generation of the polling signal while the first processor 851 determines whether or not the tray detachment event is valid. In various embodiments of the disclosure, if the tray detachment event is valid, the second processor 852 may delay the generation of the polling signal, thereby preventing a malfunction of erroneously recognizing the state of the SIM card 226 as an internal error state of the SIM card 226.

In process 807 the first processor 851 according to an embodiment may determine that the tray detachment event is valid if the tray signal is not received for a designated period, and transfer the tray detachment event to the second processor 852 on the basis of the determination.

In process 808, the second processor 852 according to an embodiment may determine that the state of the SIM card 226 is an absent state due to the detachment of the tray 430 in response to reception of the tray detachment event from the first processor 851, In an embodiment of the disclosure, if the tray detachment event is valid, the second processor 852 may delay determination of whether or not there is an error in the SIM card 226, thereby preventing a malfunction of erroneously recognizing the state of the SIM card 226 as an internal error state of the SIM card 226.

In various embodiments of the disclosure, the electronic device accurately detects that the tray for loading the SIM card is detached, and thereby a malfunction of the electronic device due to erroneous recognition of whether or not the SIM card is inserted can be prevented. Further, the electronic device can be designed to have a waterproof function. However, if the tray is detached from the electronic device, waterproof performance of the electronic device cannot be ensured. The electronic device according to various embodiments of the disclosure can prevent a malfunction of erroneously recognizing the tray detachment event as an internal error state of the SIM card, and increase convenience of a user by accurately outputting a waterproof alert based on the tray detachment event. In addition, various embodiments of the disclosure can prevent a malfunction of at least one process that is configured to operate in response to the tray detachment event detected by the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities.

According to various embodiments, one or more of the above-described components may be omitted, or one or more other components may be added. Alternatively or additionally, a plurality of components (e.g., modules or programs) may be integrated into a single component in such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a tray configured to load a SIM card;
a first processor electrically connected to the SIM card; and
a second processor electrically connected to the first processor,
wherein the first processor is configured to transfer a pre-event to the second processor if a tray detachment event is detected, and the second processor is configured to identify, in each designated cycle, whether or not there is an error in the SIM card, and delay identification of whether or not there is an error in the SIM card, in response to reception of the pre-event,
wherein the first processor is further configured to:
determine, in response to detection of the tray detachment event, whether or not the tray detachment event is valid for a designated period, and
transfer the tray detachment event to the second processor if the tray detachment event is valid,
wherein the second processor is further configured to:
generate a polling signal in each designated cycle;
detect a response to the polling signal from the SIM card;
determine that there is an error in the SIM card if there is no response from the SIM card; and
determine that there is no error in the SIM card if there is no response from the SIM card after the polling signal is generated, in response to reception of the pre-event.

2. The electronic device as claimed in claim 1, wherein the second processor is configured to determine that a current state is a detached state of the tray if there is no response from the SIM card after the polling signal is generated, in response to reception of the tray detachment event from the first processor.

3. The electronic device as claimed in claim 1, wherein the second processor is configured to:
drive a designated timer in response to reception of the pre-event; and
generate no polling signal while the designated timer is driven.

4. The electronic device as claimed in claim 1, wherein the first processor is configured to output a designated notification if the tray detachment event is valid.

5. The electronic device as claimed in claim 4, wherein the designated notification includes a message that notifies that the electronic device is in a state in which a waterproof function is inactive.

6. The electronic device as claimed in claim 1, wherein the second processor is configured to:
set a designated parameter in response to reception of the pre-event; and
delay notification of whether or not there is an error in the SIM card on the basis of the designated parameter.

7. A control method for an electronic device into which a tray for loading a SIM card is inserted and which includes a first processor electrically connected to the SIM card, and a second processor electrically connected to the first processor, the control method comprising:
transferring, by the first processor, a pre-event to the second processor in response to detection of a tray detachment event; and
identifying, by the second processor, in each designated cycle, whether or not there is an error in the SIM card, and delaying, by the second processor, identification of whether or not there is an error in the SIM card, in response to reception of the pre-event,
wherein the control method further comprises:
determining, by the first processor, in response to detection of the tray detachment event, whether or not the tray detachment event is valid for a designated period; and
transferring, by the first processor, the tray detachment event to the second processor if the tray detachment event is valid, and
wherein the second processor is configured to:
generate a polling signal in each designated cycle;
detect a response to the polling signal from the SIM card;
determine that there is an error in the SIM card if there is no response from the SIM card; and
determine that there is no error in the SIM card if there is no response from the SIM card after the polling signal is generated, in response to reception of the pre-event.

8. The control method as claimed in claim 7, further comprising determining, by the second processor, in response to reception of the tray detachment event from the first processor, that a current state is a detached state of the tray if there is no response from the SIM card after the polling signal is generated.

9. The control method as claimed in claim 7,
wherein the delaying identification of whether or not there is an error in the SIM card includes:
driving, by the second processor, a designated timer in response to reception of the pre-event, and
generating, by the second processor, no polling signal while the designated timer is driven.

10. The control method as claimed in claim 7, wherein the first processor is configured to output a message that notifies that the electronic device is in a state in which a waterproof function is inactive if the tray detachment event is valid.

11. The control method as claimed in claim 7, further comprising:
setting, by the second processor, a designated parameter in response to reception of the pre-event; and
delaying, by the second processor, notification of whether or not there is an error in the SIM card on the basis of the designated parameter.

* * * * *